UNITED STATES PATENT OFFICE.

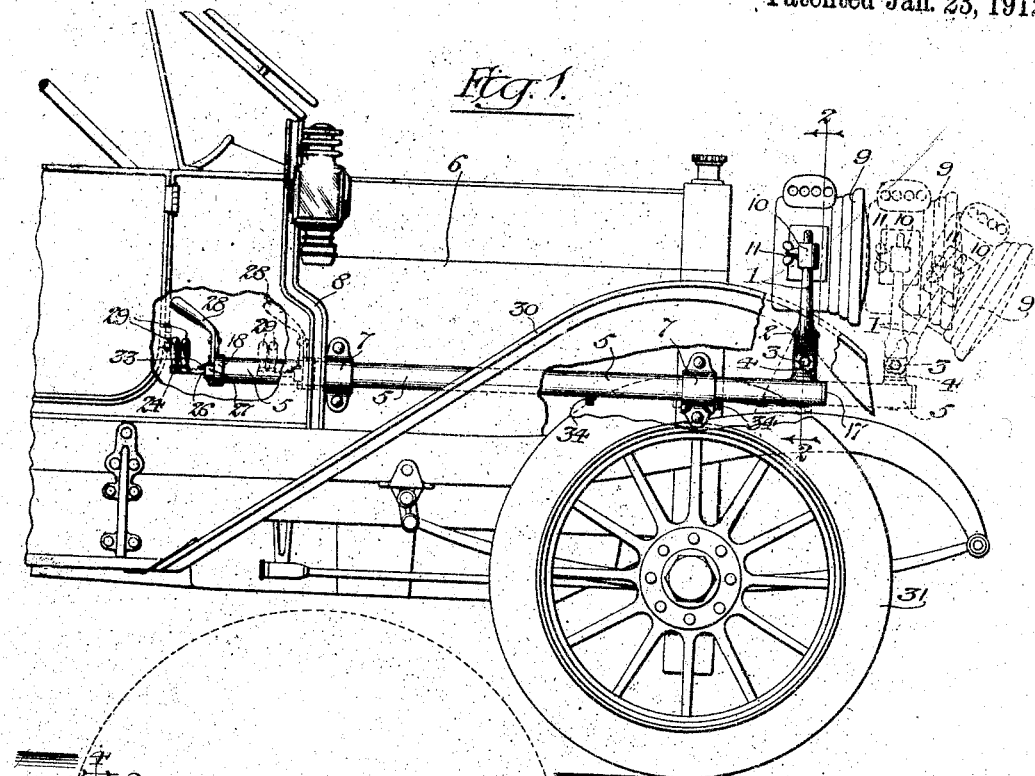

WILLIAM R. ELWELL, OF CHICAGO, ILLINOIS, ASSIGNOR TO THE FIRM OF PEIRCE, FISHER & CLAPP, OF CHICAGO, ILLINOIS.

LAMP ATTACHMENT FOR AUTOMOBILES OR THE LIKE.

1,015,483.  Specification of Letters Patent.  Patented Jan. 23, 1912.

Application filed June 2, 1911. Serial No. 630,937.

*To all whom it may concern:*

Be it known that I, WILLIAM R. ELWELL, a citizen of the United States, and a resident of Chicago, county of Cook, and State of Illinois, have invented certain new and useful Improvements in Lamp Attachments for Automobiles or the Like, of which the following is a full, clear, and exact description.

The invention relates to lamp attachments for automobiles and the like and seeks to provide a simple and effective construction which may be readily operated by the driver of the automobile, and by which a lamp at the front of the automobile can be rotated about a vertical axis to throw the beam of light therefrom in any direction in a horizontal plane, and also tilted about a horizontal axis to throw the beam of light up or down hill while the automobile remains on level ground.

The invention consists in the features of improvement hereinafter set forth, illustrated in the preferred form in the accompanying drawings and more particularly pointed out in the appended claims.

In the drawings, Figure 1 is an elevation of the front end of an automobile with the improved attachment applied thereto. Fig. 2 is a vertical section of the attachment on the line 2—2 of Fig. 1. Fig. 3 is a rear end view of the attachment and Fig. 4 is a longitudinal section thereof on the line 4—4 of Figs. 2 and 3.

The improved attachment comprises a lamp bracket which is preferably forked and consists of side arms 1 which are connected adjacent their lower ends by an integral curved cross bar 2. The lower ends of the side arms are curved inwardly toward each other and are connected by a pair of horizontal pivot bolts 3 to a T-shaped head 4. The head 4 is mounted upon a suitable support to rotate about a vertical axis. This support preferably comprises a longitudinal tube or casing 5 of rectangular cross section and which is mounted in horizontal position at the front end and at one side of the automobile. The supporting casing 5 is held in position at one side of the hood 6 of the automobile by a pair of brackets or clips 7 fixed to the lower side portion of the hood and adjacent its ends. The casing is arranged to slide longitudinally through the clips or brackets 7 and its rear end extends through an opening in the dash-board 8 of the automobile and within convenient reach of the driver of the machine.

The lamp 9 mounted on the lamp bracket may be of any suitable form. Such lamps are usually provided with perforated side lugs 10 which are adapted to engage the side arms 1 of the forked bracket and be connected thereto by set screws 11. The lower inwardly curved ends of the side arms 1 of the lamp supporting bracket are preferably provided with a pair of leaf springs 12 which are fixed to the upper faces of the lower end portions of the arms and extend inwardly over and bear upon the upper face of the head 4. These springs prevent the wabbling of the bracket and lamp supported thereby about the horizontal pivot bolts 3.

The lower portion of the T-head is journaled in the upper wall of the casing 5 at the forward end thereof. A shaft 13 extends axially through the head 4 and between the horizontal pivot bolts 3. The lower end of the shaft 13 is journaled in the lower horizontal wall of the supporting casing 5. Its upper end projects above the head 4 and is provided with a laterally projecting crank arm 14 which is connected to the lamp bracket to tilt the same. In the preferred arrangement shown, the crank arm 14 is provided at its end with an upwardly projecting pin 15 which extends through a slot 16 in the cross bar 2 of the lamp bracket. By rotating the head 4, the lamp bracket and lamp supported thereby are rotated about a vertical axis, as indicated in dotted lines in Fig. 4, and by rotating the shaft 13, the lamp bracket and lamp thereon can be tilted, as indicated in dotted lines in Figs. 1 and 4. The pin 15 loosely engages the slot 16 to permit this tilting movement, but the bracket is ordinarily securely held in upright position and prevented from wabbling by the engagement of the leaf springs 12 with the upper face of the head 4.

The tubular supporting casing 5 is preferably provided at its outer end with a cap 17 and at its inner end with a cap 18. A sprocket wheel 19 is fixed to the lower end of the head 4 within the casing 5 and a second, idler sprocket 20 is arranged within the casing upon a vertical stud 21 therein. A chain 22 extends about the sprockets 19 and 20 and is provided at one point with a laterally projecting pin 23. A longitudinal shifter rod 24 extends through the supporting casing 5 and the outer upturned end of this rod engages the pin 23.

A laterally projecting arm 25 is fixed to the shaft 13 below the sprocket wheel 19 and is engaged by the forward end of a shifter rod 26 which extends longitudinally through the casing 5. The shifter rods 24 and 26 are preferably rectangular in section and at their rear ends extend through a pair of guide sleeves 27 in the cap plate 18. The cap plate is provided with an upwardly and rearwardly projecting handle 28 and the shifter rods are provided with upwardly and outwardly projecting handles 29.

The parts are ordinarily positioned to hold the lamp 9 in the position shown in full lines in Fig. 1. By means of the handle 28, the driver of the machine can shift the casing 5, lamp bracket and lamp carried thereby forwardly, as indicated in dotted lines in Fig. 1. The lamp bracket and lamp supported thereby are then in position to clear the mud guard 30 over the adjacent front wheel 31 and can be rotated about a horizontal axis and tilted about a horizontal axis by manipulating the shifter rods 24 and 26. The shifter rod 24 moves the chain 22 back and forth and thus rotates the head 4 and parts carried thereby, while the shifter rod 26 oscillates the shaft 13 and through the medium of the crank 14 on the shaft, tilts the bracket and lamp, as indicated in dotted lines in Figs. 1 and 4. The rear ends of the shifter rods are preferably provided with a series of notches 32 which are arranged to be engaged by catches 33 to hold the rods in set position. The supporting casing 5 is provided adjacent its forward end with a pair of depending stop lugs 34 which coöperate with the front clip or bracket 7 to limit the longitudinal movement of the supporting casing 5 and the lamp bracket mounted thereon.

Any suitable form of lamp can be used with the improved attachment and the latter is so constructed that the driver of the machine can manipulate the lamp in any desired manner.

It is obvious that numerous changes may be made in the details set forth without departure from the essentials of the invention as defined in the claims.

I claim as my invention:—

1. In lamp attachments for automobiles and the like, the combination of a suitable support, a head mounted on said support to rotate about a vertical axis, a lamp supporting bracket horizontally pivoted at its lower end to said head, a vertical shaft extending axially through said head and a crank arm on the upper end of said shaft connected to said bracket for tilting the same, substantially as described.

2. In lamp attachments for automobiles and the like, the combination of a suitable support, a head mounted on said support to rotate about a vertical axis, a lamp supporting bracket horizontally pivoted at its lower end to said head, a vertical shaft extending axially through said head and provided with a crank arm at its upper end having a pin and slot connection with said bracket for tilting the same, and means for rotating said head and said shaft, substantially as described.

3. In lamp attachments for automobiles and the like, the combination of a suitable support, a head mounted on said support to rotate about a vertical axis, a forked, lamp supporting bracket comprising connected side arms horizontally pivoted on said head, a shaft extending axially through said head and having a crank arm at its upper end connected to said forked bracket for tilting the same, and means for rotating said head and said shaft, substantially as described.

4. In lamp attachments for automobiles and the like, the combination of a suitable support, a head mounted on said support to rotate about a vertical axis, a forked, lamp supporting bracket comprising side arms and a connecting cross-bar between the lower ends of said arms, horizontal pivot bolts connecting the lower ends of said arms to said head, a shaft extending axially through said head and between said pivot bolts, and a crank arm on the upper end of said shaft having a pin-and-slot connection with the cross-bar of said bracket, substantially as described.

5. In lamp attachments for automobiles and the like, the combination of a support, a head mounted on said support to rotate upon a vertical axis, a forked lamp-supporting bracket comprising connected side arms horizontally pivoted on said head, a shaft extending axially through said head, a crank arm on the upper end of said shaft connected to said bracket, a sprocket wheel on said head, an idler sprocket on said support, a chain connecting said sprocket wheels, an arm on the lower end of said shaft and a pair of shifter rods connected respectively to said arm and said chain, substantially as described.

6. In lamp attachments for automobiles and the like, the combination of a longitudinally shiftable support, a head mounted on the forward end of said support to rotate on a vertical axis, a lamp supporting bracket horizontally pivoted on the head, a shaft extending axially through said head and connected at its upper end to said bracket to tilt the same, and a pair of longitudinal shifter rods on said support connected respectively to said head and to said support, substantially as described.

7. In lamp attachments for automobiles and the like, the combination of a longitudinally shiftable support, a head mounted on the forward end of said support to rotate on a vertical axis, a forked, lamp-supporting bracket comprising connected side arms horizontally pivoted at their lower ends on said head, a shaft extending axially through said head, a crank arm on the upper end of said shaft having a pin-and-slot connection with said bracket for tilting the same, a sprocket on said head, an idler sprocket on said support, a chain connecting said sprockets, an arm on the lower end of said shaft, and a pair of longitudinal shifter rods carried by said support and connected respectively to said arm and said chain, substantially as described.

8. In lamp attachments for automobiles and the like, the combination with a longitudinal shiftable, supporting casing, a head rotatably mounted at the forward end of said casing to rotate on a vertical axis, a lamp-supporting bracket horizontally pivoted upon said head outside of said supporting casing, a shaft extending axially through said head and connected at its upper end to said bracket to tilt the same, and a pair of longitudinal shifter rods extending through said casing and operatively connected respectively to said head and said shaft, substantially as described.

WILLIAM R. ELWELL.

Witnesses:
ELEANOR HAGANOW,
KATHARINE GIERLACH.